United States Patent [19]

Shiozawa et al.

[11] Patent Number: 5,139,067
[45] Date of Patent: Aug. 18, 1992

[54] TIRE WHEEL

[75] Inventors: Shinji Shiozawa, Tokyo; Tadashi Hagiwara, Kodaira; Masato Hodate, Higashiyamato, all of Japan

[73] Assignee: Bridgestone Corporation, Tokyo, Japan

[21] Appl. No.: 807,741

[22] Filed: Dec. 16, 1991

Related U.S. Application Data

[63] Continuation of Ser. No. 456,911, Dec. 26, 1989, abandoned.

[30] Foreign Application Priority Data

Dec. 29, 1988 [JP] Japan .................. 63-335088

[51] Int. Cl.$^5$ .............................................. B60B 21/02
[52] U.S. Cl. .............................. 152/381.3; 152/381.4; 152/379.3
[58] Field of Search ........................ 301/95-99; 152/379.3, 379.4, 379.5, 381.3, 381.4, 382, 383, 384

[56] References Cited

U.S. PATENT DOCUMENTS

| | | | |
|---|---|---|---|
| 3,405,755 | 10/1968 | Verdier | 152/381.3 |
| 4,246,950 | 1/1981 | Welter | 152/381.4 |
| 4,253,514 | 3/1981 | Imamura | 152/379.3 X |
| 4,351,382 | 9/1982 | Corner et al. | 152/381.4 |
| 4,487,456 | 12/1984 | Zulauf | 301/96 X |
| 4,502,521 | 3/1985 | Tavazza et al. | 152/375 X |
| 4,606,390 | 8/1986 | Shute | 152/381.4 |
| 4,747,440 | 5/1988 | Holmes et al. | 152/379.3 X |
| 4,878,527 | 11/1989 | Noma | 152/384 X |
| 5,082,041 | 1/1992 | Shiozawa et al. | 152/381.3 |

FOREIGN PATENT DOCUMENTS

| | | | |
|---|---|---|---|
| 0176647 | 4/1986 | European Pat. Off. | 152/381.4 |
| 0334955 | 10/1989 | European Pat. Off. | |
| 2853633 | 6/1979 | Fed. Rep. of Germany | 152/381.4 |
| 3347119 | 12/1983 | Fed. Rep. of Germany | |
| 2333654 | 12/1976 | France | |
| 0113602 | 5/1987 | Japan | 152/384 |
| 0268704 | 11/1987 | Japan | 152/379.3 |
| 0275802 | 11/1987 | Japan | 152/381.4 |
| 0306301 | 12/1989 | Japan | 152/379.3 |
| 67264 | 3/1973 | Luxembourg | |

OTHER PUBLICATIONS

Patent Abstracts of Japan, vol. 8, No. 195 (M-323) (1632) Sep. 7, 1984, & JP-A-59 84603 (Sumitomo) May 16, 1984.

*Primary Examiner*—Russell D. Stormer
*Attorney, Agent, or Firm*—Sughrue, Mion, Zinn, Macpeak & Seas

[57] ABSTRACT

A tire wheel includes a pair of flanges provided on both axial ends, respectively, a pair of bead seats extending from the flanges axially inwardly, a well provided between these bead seats and concaved radially inwardly of the bead seats, and at least one hump circumferentially extending provided between the well and one of the bead seats and having a seat side inclined surface on a side of the relevant beat seat and a well side inclined surface on a side of the well to form a top as a boundary between both the inclined surfaces. The seat side inclined surface is formed by part of a conical surface intersecting at an angle of 5°-35° with a straight line in parallel with a tire axis. A concaved obtuse corner is formed at a boundary between the seat side inclined surface and the relevant bead seat.

12 Claims, 6 Drawing Sheets

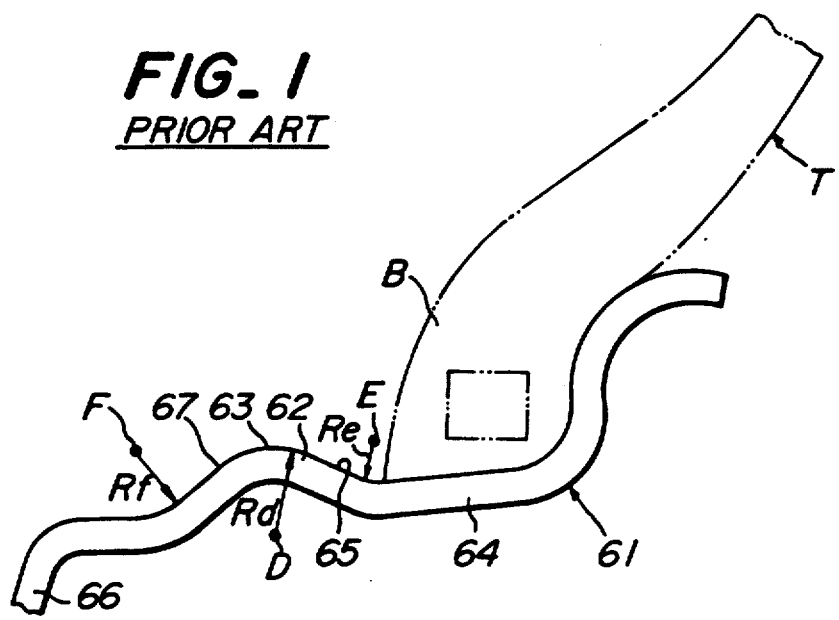
FIG_1
*PRIOR ART*
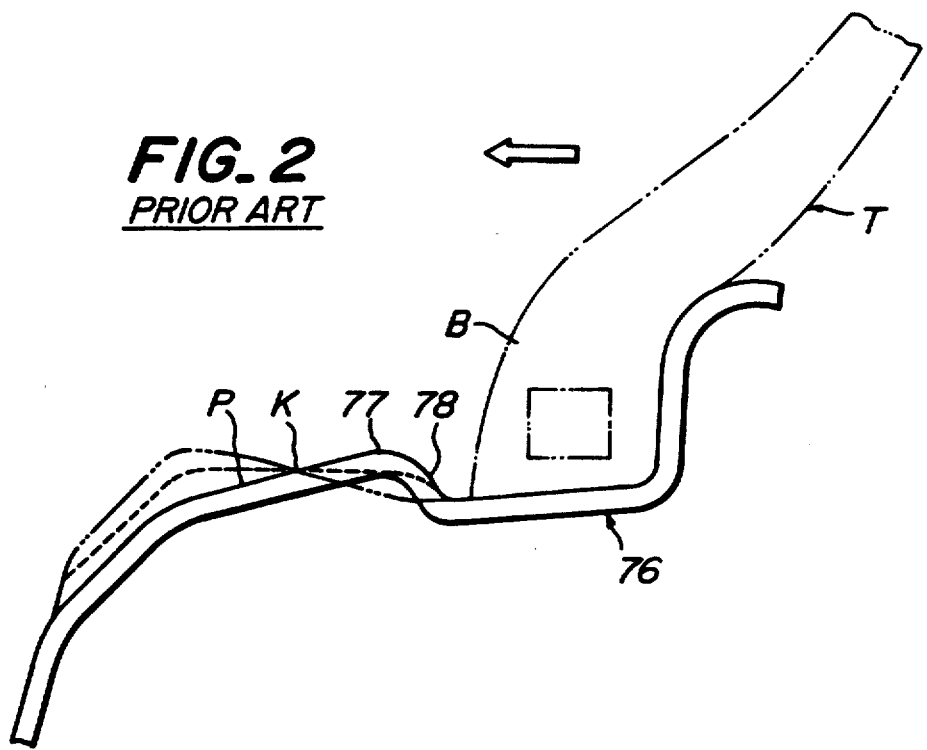
FIG_2
*PRIOR ART*

TIRE WHEEL

BACKGROUND OF THE INVENTION

This invention relates to a tire wheel having a hump which prevents dislodgment of a bead portion of a pneumatic tire from a bead seat of the tire wheel onto its well when inner pressure of the tire lowers.

A tire wheel having a hump has been known as shown, for example, in FIG. 1. The hump 62 of the tire wheel 61 has a seat side inclined surface 65 on a side of a bead seat 64 and a well side inclined surface 67 on a side of a well 66 on both sides of a top 63. The seat side inclined surface 65 is formed by a circular arc surface which is radially outwardly convex having a radius Rd, a center D and a circular arc surface which is radially inwardly convex having a radius Re and a center E. On the other hand, the well side inclined surface 67 is also formed by a circular arc surface which is radially outwardly convex having the radius Rd and the center D and a circular arc surface which is radially inwardly convex having a radius Rf and a center F.

With this tire wheel, however, as the seat side inclined surface 65 of the hump 62 consists of two circular arc surfaces smoothly changing, there is a risk of a bead portion B of a pneumatic tire T easily riding over the hump 62 to fall onto the well 66 when inner pressure of the tire has lowered due to a puncture or the like and great transverse forces act on the pneumatic tire upon turning.

In order to solve this problem, tire wheels have been proposed as shown in FIGS. 2 and 3. In the tire wheel 76 shown in FIG. 2, a cross-sectional shape of a hump 77 is changed with circumferential positions. Starting from the shape shown in solid lines at a circumferential position of 0°, shapes at circumferential positions of 90° and 270° are as shown in a broken line and a shape at a circumferential position of 180° is as shown in a two-dot-and-dash line. In other words, an inclined angle of a plane P is progressively changed dependent upon change in circumferential position about an axial determined position K. A seat side inclined surface 78 is inclined at a large angle with respect to a tire axis at the circumferential position of 0°, but at a small angle at the circumferential position of 180°.

On the other hand, with the tire wheel 81 shown in FIG. 3, a seat side inclined surface 83 of a hump 82 extends radially outwardly or substantially perpendicularly to a tire axis.

It is assumed that inner pressure of a tire T mounted on the tire wheel 76 shown in FIG. 2 lowers and the tire T is subjected to traverse forces in a direction shown by an arrow in FIG. 4. Under such an assumption, as the inclined angle of the seat side inclined surface 78 changes with circumferential positions, it is difficult for a bead portion B of the tire T to move toward the well 79 at positions near to the circumferential position of 0° where the inclined angle of the seat side inclined surface 78 is large because the bead portion B abuts against the inclined surface 78. However, it is easy for the bead portion B to move toward the well 79 at positions near to the circumferential position of 180° because the inclined angle of the seat side inclined surface 78 is small sufficient to easily ride over the inclined surface 78.

After part of the bead portion B (near to the 180° circumferential position) has once deformed and ridden on the seat side inclined surface 78 in this manner, the deformed portion of the bead portion B is repeatedly subjected to traverse forces every time it arrives on a ground contacting side so that the deformed portion progressively moves axially inwardly until the bead portion B falls onto the well 79. Although the tire wheel 76 shown in FIG. 2 is improved to some extent for preventing the bead portion B from falling onto the well 79 in comparison with the tire wheel 61 shown in FIG. 1, the tire wheel 76 is insufficient to be used for a high performance tire recently developed. Moreover, the tire wheel is particular in shape so that its forming is difficult and expensive.

On the other hand, it is also assumed that when inner pressure of the pneumatic tire T mounted on the tire wheel 81 shown in FIG. 3 lowers, traverse forces act upon the tire T. In this case a bead toe C of the bead portion B on a ground contacting side abuts against the seat side inclined surface 83 of the hump 82 extending substantially vertical to the tire axis. Therefore, large shearing forces act upon the bead toe C to damage part of the bead toe C and to expose carcass cords and the like. Moreover, there is a problem that such damage of the bead toe C would also occur when the tire T is removed from the wheel because a fairly large force is required for the removal.

SUMMARY OF THE INVENTION

It is a primary object of the invention to provide an improved tire wheel which eliminates all the disadvantages of the prior art and is capable of effectively preventing any dislodgment of a bead portion onto a well of the wheel without damaging a bead toe.

In order to accomplish this object, in a tire wheel including a pair of flanges provided on both axial ends, a pair of bead seats extending from the flanges axially inwardly, a well provided between these bead seats and concaved radially inwardly of the bead seats, and at least one hump circumferentially extending provided between the well and either of the bead seats and having a seat side inclined surface on a side of the relevant bead seat and a well side inclined surface on a side of the well to form a top as a boundary between both the inclined surfaces, according to the invention said the seat side inclined surface of the hump is formed by part of a conical surface intersecting at an angle of 5°-35° with a straight line in parallel with a tire axis and a concaved obtuse corner is formed at a boundary between the seat side inclined surface and the relevant bead seat.

In the invention, the well side inclined surface is preferably formed by part of a conical surface intersecting at an angle of 15°-45° with a straight line in parallel with the tire axis.

It is now assumed that a pneumatic tire mounted on the tire wheel according to the invention is running. When the inner pressure of the pneumatic tire lowers by puncture or the like the pneumatic tire is subjected to traverse forces by turning or the like. A bead portion of the pneumatic tire thus tends to move in axially inwardly to fall onto a well of the tire wheel. However, the hump of the tire wheel according to the invention has a seat side inclined surface formed by part of a conical surface so that a concaved obtuse corner is formed at a boundary between the seat side inclined surface and the bead seat. Therefore, the axially inward movement of the bead portion is restrained because a sharp bead toe of the bead portion abuts against the corner.

Even if the bead portion rides on the seat side inclined surface by such traverse forces, the bead portion uniformly rides on the inclined surface over the entire circumference because of the seat side inclined surface made of part of the conical surface to have same inclined angles at any circumferential positions. In case that the bead portion uniformly rides on the seat side inclined surface over the entire circumference in this manner, it is required to greatly elongate the bead portion in order to cause the bead portion to ride over the hump of the tire wheel. Such a large elongation of the bead portion causes a great hoop tensile force at the bead portion and thereby substantially uniformly distributed forces on axially inward surfaces of the bead portion. These distributed forces serve to restrain the axially inward movement of the bead portion further.

Moreover, as the seat side inclined surface according to the invention is substantially flat, the bead portion and the inclined surface uniformly contact each other, different from curved (arcuate) surfaces of the prior art. As a result, a large frictional force therebetween will be caused. In this manner, the axially inward movement of the bead portion is effectively restrained by the hump to prevent the bead portion from falling onto the well of the tire wheel.

As above described, the bead toe of the bead portion abuts against the corner of the hump of the wheel. Since the seat side inclined surface intersects at 5°-35° with an axis in parallel with a tire axis, an angle of the corner is a large obtuse angle, as a result of which the bead toe pass by the corner to partially ride on the seat side inclined surface when a traverse force acts locally on the bead toe to a certain extent. Therefore, there is no large shearing forces acting on the bead toe which may damage the bead toe.

The tire wheel for a pneumatic tire according to the invention includes a corner having a large obtuse angle and a small intersecting angle of the seat side inclined surface with the tire axis so that an entire hoop of the bead is not subjected to large tensile forces even large traverse forces locally act upon the bead portion. The result is that the tire can be relatively easily dismounted from the tire wheel without any damaging of the bead toe. Moreover, as the hump of the tire wheel according to the invention is not of a particular shape, the tire wheel can be easily formed to produce inexpensively.

Moreover, in the event that the well side inclined surface is formed by part of a conical surface intersecting at 15°-45° with a straight line in parallel with the tire axis, part of the bead portion abuts against the inclined surface to make difficult to be fitted thereon, while another part of the bead portion does not abut against the inclined surface to make easy to be fitted thereon when inflating the tire after mounting the tire on the tire wheel. In other words, the bead portion does not move uniformly over all the circumference to fit on the inclined surface so that the bead portion can be fitted on the bead seat with relatively low pressure. As a result, the bead portion can easily ride over the hump of the tire wheel so that mounting of the tire on the rim of the wheel can be easily effected.

The invention will be more fully understood by referring to the following detailed specification and claims taken in connection with the appended drawings.

BRIEF DESCRIPTION OF THE DRAWINGS

FIG. 1 is a sectional view of the proximity of a hump illustrating one example of a tire wheel of the prior art;

FIG. 2 is a sectional view of the proximity of a hump illustrating another example of a tire wheel of the prior art;

DETAILED EXPLANATION OF THE PREFERRED EMBODIMENTS

Figure 6:
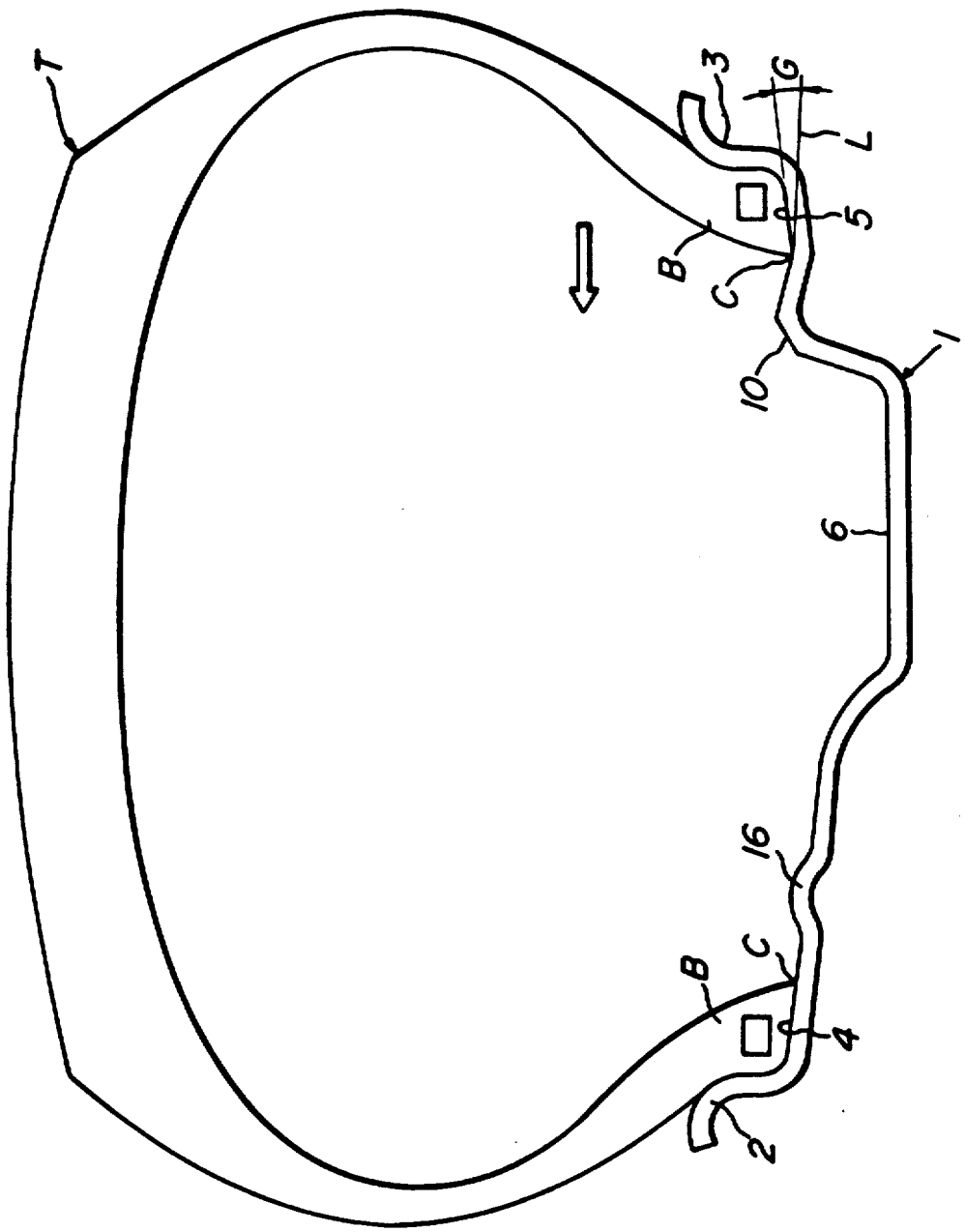
FIG. 6 is a sectional view along a meridian plane illustrating one embodiment of a tire wheel according to the invention under a condition on which a pneumatic tire is mounted and inflated.
Figure 7:
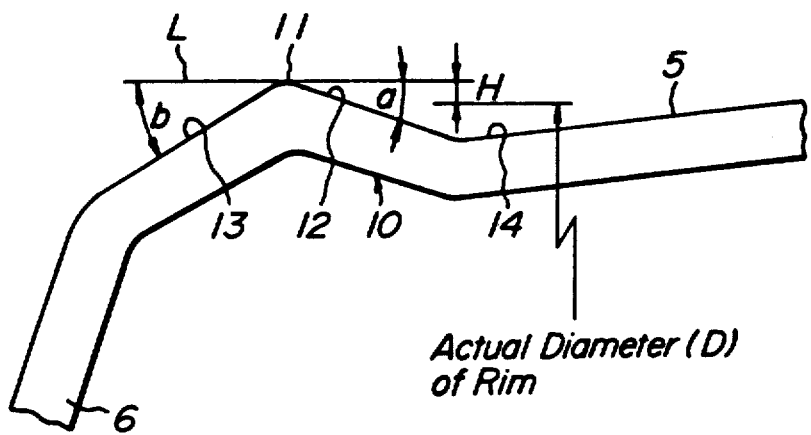
FIG. 7 is a sectional view illustrating the proximity of a hump of the tire wheel shown in FIG. 6.

A tire wheel 1 shown in FIGS. 6 and 7 is made of a metal such as a steel, an aluminum alloy and the like or a reinforced plastic material (FRP, GFRP and the like) and has at both axial ends a pair of flanges 2 and 3 extending substantially perpendicular to an axis of a tire. A pair of bead seats 4 and 5 extend axially inwardly from the flanges 2 and 3 and are inclined at an intersecting angle G of the order of 5° with respect to a straight line L being parallel to the axis of the tire. The bead seats 4 and 5 are inclined radially inwardly in axially inward directions. Therefore, these bead seats 4 and 5 are formed by parts of conical surfaces tapered toward an axially inward position.

Moreover, between the pair of bead seats 4 and 5 is provided a radially inwardly concaved well 6 which is a circumferentially extending groove and used in mounting and dismounting the tire T on and from the wheel. A circumferentially extending hump 10 is provided between the well 6 and at least one of the bead seats 4 and 5 (in this embodiment the bead seat 5 which is on an outer side of a vehicle and nearer to the well 6). The hump 10 has a seat side inclined surface 12 on the side of the bead seat 5 and a well side inclined surface 13 on the side of the well 6 on both sides of a top 11 (radially outermost end). The seat side inclined surface 12 is formed by part of a conical surface which intersects at an angle a of 5°-35° with a straight line L in parallel with the tire axis.

The reason why the intersecting angle a of the seat side inclined surface 12 with respect to the straight line L is within a range of 5°-35° is as follows. If the angle a is less than 5°, an axially inward movement of the bead portion B could not be restrained when the inner pressure of the tire lowers and the tire is subjected to traverse forces. On the other hand, if the angle is more than 35°, a bead toe would engage the seat side inclined surface to be damaged when the inner pressure lowers and traverse forces act or in removing the tire from the wheel. The part of the conical surface forming the seat side inclined surface 12 extends to a boundary between the surface 12 and the bead seat 5, so that a concaved corner 14 having an obtuse angle (140°-170°) is formed at the boundary. The intersecting angle a is more preferably 10°-25°. It is 15° in this embodiment.

On the other hand, the well side inclined surface 13 is formed by part of a conical surface intersecting at an angle b of 15°-45° with the straight line L in parallel with the tire axis. The reason why the angle b is within 15°-45° is as follows. If the angle b is less than 15° or more than 45°, a resistance of the hump 10 to the bead portion B is excessively high in mounting the tire on the tire wheel so that inner pressure of the tire exceeds the safety value of the JATMA standard. The intersecting angle b is preferably 20°-40°. It is 30° in this embodiment.

A hump height H of the hump 10 or a value obtained by dividing by 2 a diameter of the hump 10 at the top 11 minus an actual diameter D of the rim is preferably 0.5 mm-2.5 mm. If the value H is less than 0.5 mm, the performance of restraining the movement of the bead portion B of the pneumatic tire T toward the well 6 is lowered. On the other hand, if the value H is more than 2.5 mm, the inner pressure of the tire in mounting the tire on the wheel rim may exceed the safety standard value of JATMA standard. Moreover, the hump height H is more preferably 1.0 mm-2.0 mm. It is 1.5 mm in this embodiment.

Figure 8:
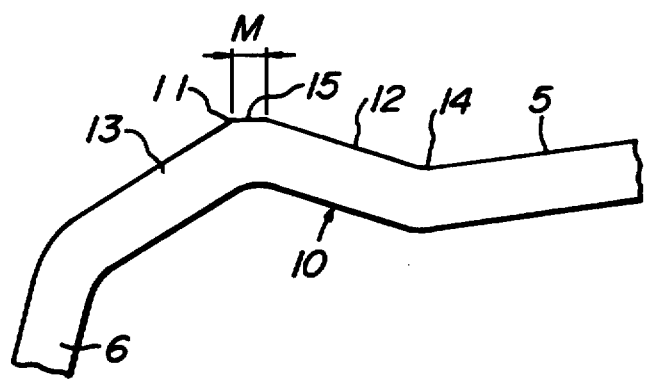
FIG. 8 is a sectional view similar to FIG. 7 illustrating another embodiment of the invention; an FIG. 9 is a sectional view illustrating a condition of a tire mounted on the tire wheel according to the invention when inner pressure of the tire lowers and the tire is subjected to traverse forces.

The top 11 of the hump 10 scrapingly contacts an inner surface of the bead portion B in mounting and dismounting the tire from the tire wheel. In order to avoid breakage of the bead portion B caused by the scraping contact with the top of the hump of the wheel, the top 11 is formed in an arcuate cross-section having a radius of 1 mm-5 mm. It is 3 mm in this embodiment. Moreover, the top 11 may be formed with a flat surface 15 in section in parallel with the tire axis as shown in FIG. 8. In this case, an axial width M of the flat surface 15 is preferably within 0.5 mm-3 mm.

As shown in FIG. 6, moreover, a hump 16 extending in a circumferential direction is also provided for safety between the well 6 and a remaining bead seat 4 which is on an inner side with respect to the vehicle remote from the well 6. This hump 16 is also constructed by three circular arc surfaces in the same manner as in the hump of the prior art shown in FIG. 1. The tubeless pneumatic tire T is mounted on the tire wheel 1, whose a pair of bead portions B are seated on the bead seats 4 and 5, respectively.

The operation of the tire wheel of the one embodiment according to the invention will be explained hereinafter.

It is assumed that a pneumatic tire T mounted on the tire wheel is running. When the inner pressure of the pneumatic tire lowers due to puncture or the like and the tire is subjected to traverse forces in a direction shown by an arrow in FIG. 6, the bead portion B tends to move axially inwardly to fall onto the well 6. However, the hump 10 of the tire wheel 1 is formed by the part of the conical surface and includes the concaved corner 14 having the obtuse angle at the boundary between the seat side inclined surface 12 and bead seat 5. Therefore, the sharp bead toe C abuts against the corner 14 to restrain the further axially inward movement of the bead portion B.

Figure 9:
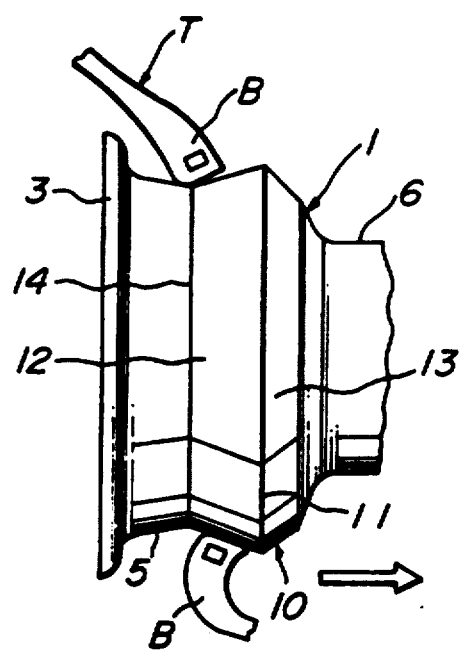

Moreover, even if the bead portion B rides on the seat side inclined surface 12 by the traverse forces, the bead portion B rides on the seat side inclined surface uniformly as shown in FIG. 9 because of the seat side inclined surface 12 being formed by the part of the conical surface to have the constant inclined angles relative to the straight line L in any circumferential positions. In order to ride over the humps 10 after the bead portion B has uniformly ridden on the seat side inclined surface 12, the bead portion B must greatly elongate for riding over beyond the hump 10. Therefore, the axially inward movement of the bead portion B is additionally restrained. Accordingly, the axially inward movement of the bead portion B is effectively restrained by the hump 10 to prevent the bead portion B from falling onto the well 6 in this manner.

In this case, the bead toe C abuts against the corner 14 as above described. However, as the seat side inclined surface 12 intersects with the straight line L at the angle within the range of 5°-35°, the angle of the corner 14 becomes a large obtuse angle within 140°-170°. As a result, upon exerting traverse forces more than a certain extent to the bead toe C, the bead toe C passes by the corner 14 and rides on the seat side inclined surface 12. Therefore, no large shearing forces acts on the bead toe C so that the bead toe C is not damaged. Moreover, such a pneumatic tire T can be easily dismounted from the tire wheel without damaging the bead toe because of the large obtuse angle of the corner 14 and small intersecting angle a of the seat side inclined surface 12 to the straight line L.

On the other hand, in mounting the pneumatic tire T onto such a tire wheel 1, after the pneumatic tire T has been arranged on the tire wheel 1, the tire T is filled with inner pressure to a predetermined pressure to cause the bead portions B to move beyond the humps 10 and 16 to the bead seats 4 and 5 on which the bead portions B are seated, respectively. In this case, the bead portion B can easily ride over the hump 10 to achiene easy mounting operation of a tire on the wheel because of the well side inclined surface 13 formed by the part of the conical surface intersecting at the angle of 15°-45° with the straight line L in parallel with the tire axis.

Figure 3:
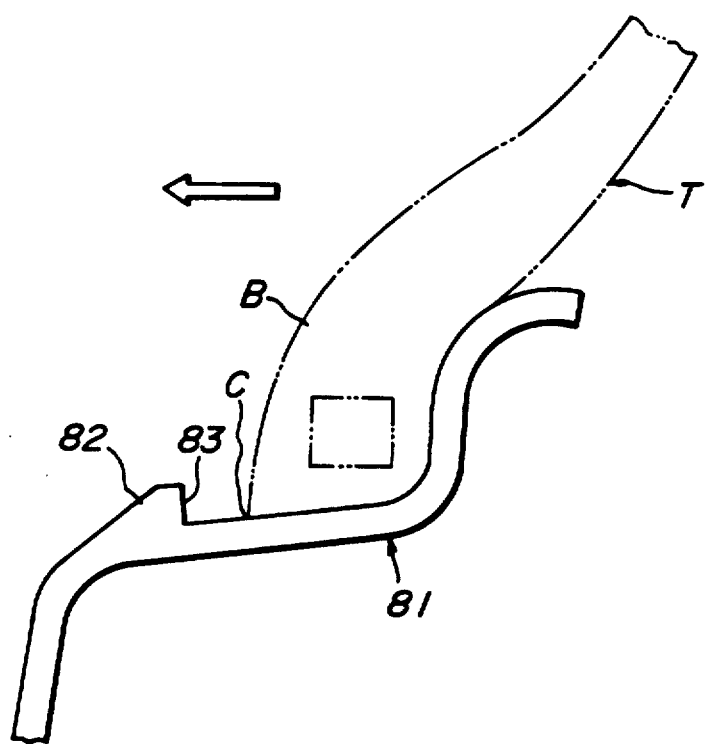
FIG. 3 is a sectional view of the proximity of a hump illustrating a further example of a tire wheel of the prior art.
Figure 4:
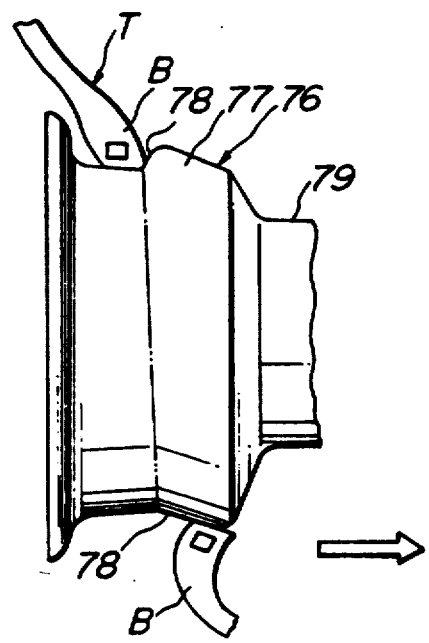
FIG. 4 is a sectional view illustrating a condition of a pneumatic tire mounted on the wheel shown in FIG. 2 when inner pressure of the pneumatic tire lowers and the tire is subjected to traverse forces.
Figure 5:
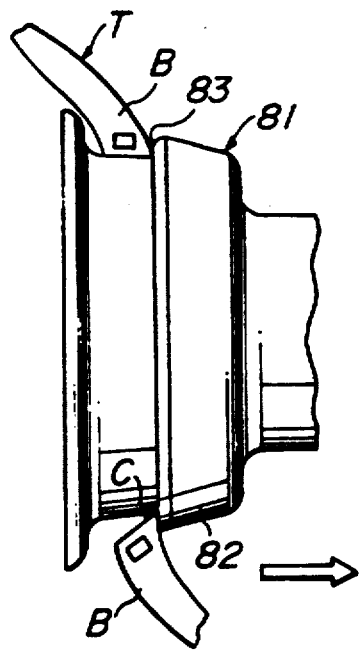
FIG. 5 is a sectional view illustrating a condition of a pneumatic tire mounted on the wheel shown in FIG. 3 when inner pressure of the pneumatic tire lowers and the tire is subjected to traverse forces.

An example of a test will be explained hereinafter. In the test, there were prepared prior art tire-wheel assemblies 1, 2 and 3 as shown in FIGS. 1, 2 and 3 and tire-wheel assemblies according to the invention as shown in FIGS. 6 and 7.

The size of wheels used in the respective tire-wheel assemblies is $8 \times 17$ and an actual value of rim diameter was 436.6 mm. A material of the wheels was a reinforced aluminum. On the other hand, the pneumatic tires were radial tires for passenger cars and their size was 235/45 ZR 17.

With these tire-wheel assemblies, an experiment was effected on a rim fit test, rim dislodgment test in laboratory, rim dislodgment test on actual vehicle and rim dismounting ease and difficulty test.

In the rim fit test, after a pneumatic tire had been mounted on a wheel, the tire was filled with inner pressure to cause bead portions of the tire to sit on bead seats in position. A test result was an air pressure ($kg/cm^2$) when the bead portions sit in the positions. In this test, the maximum and minimum air pressures were measured.

In the rim dislodgment test in laboratory, after inner pressure of a tire had been removed to zero by opening a valve and the tire had been arranged on a movable flat plate having a safety walk attached to its surface with a camber angle of 3° of the tire, the movable flat plate was moved at a speed of 1 km/h applying a vertical load of 800 kg to the tire during which a slip angle was progressively increased to cause the bead portion of the tire to fall onto the well. The test result was a slip angle (degree) when the bead portion fell into the well.

In the rim dislodgment test on the actual vehicle, after a sports passenger car had been equipped with tires with inner pressure of zero kg/cm², the car was turned three times in a J turn having a radius of 30 m at a speed of 60 km/h to cause some rim dislodgment. The test result was the number of turning times when rim dislodgment occurred.

In the rim dismounting ease and difficulty test, a tire with inner pressure of zero kg/cm² was dismounted from a rim by an operator, and the result was judged synthetically from feeling in the dismounting operation, time required for the dismounting and an outer appearance by observation (for example, existence of chips).

Results of these tests ar shown in the Table in the specification. As can be seen from the Table, with the tire-wheel assemblies according to the invention the rim mounting and dismounting are easily effected, and damage of bead toes and falling of bead portions are effectively prevented.

In the above embodiment, the hump 10 according to the invention has been provided between the bead seat 5 and the well 6, and the hump 16 of the prior art has been provided between the bead seat 4 and the well 6. In the invention, however, the hump according to the invention may be provided only on the side of the bead seat 5 or only on the side of the bead seat 4 and the other bead seat may be flat.

In the present invention, moreover, the hump of the prior art may be provided on the side of the bead seat 5 and the hump according to the invention may be provided on the side of the bead seat 4 different from in the above embodiment. Furthermore, the hump of the prior art used herein may be that shown in FIG. 1, 2 or 3 or may be any other known configuration. In the invention, moreover, humps according to the invention may be provided on both sides of the bead seats 4 and 5.

As above explained, according to the invention even if the inner pressure of a tire considerably lowers, particularly, in case of puncture, the falling of a bead portion of a tire onto a well of the tire wheel can be effectively prevented without damaging a bead toe of the bead portion.

It is further understood by those skilled in the art that the foregoing description is that of preferred embodiments of the disclosed tires and that various changes and modifications may be made in the invention without departing from the spirit and scope thereof.

TABLE

|  | Tire-wheel assembly of prior art 1 | Tire-wheel assembly of prior art 2 | Tire-wheel assembly of prior art 3 | Tire-wheel assembly according to the invention |
|---|---|---|---|---|
| Rim fit test (kg/cm²) Maximum value/ minimum value | 1.3/1.3 | 2.9/2.2 | 2.6/1.5 | 2.0/1.5 |
| Rim dislodgment test in laboratory (degree) | 13 | 18 | 20 | 21 |
| Rim dislodgment test on actual vehicle | Rim dislodgment at first time | Rim dislodgment at first time | Complete three times without dislodgment | Complete three times without dislodgment |
| Rim dismounting ease and difficulty test | Good | Allowable limit | Difficult rim dislodgment, damage to bead toe | Good |

What is claimed is:

1. A tire wheel comprising; a unitary non-split rim having a pair of flanges provided on axial ends of said rim, respectively, a pair of bead seats extending from the flanges axially inwardly, a well provided between said bead seats and concaved radially inwardly of the bead seats, at least one circumferentially extending hump provided between the well and either of the bead seats and having a seat side inclined surface on a side of the relevant bead seat and a well side inclined surface on a side of the well to form a top as a boundary between both the inclined surfaces, said seat side inclined surface of the hump is formed by part of a conical surface intersecting at an angle of 5°-25° with a straight line in parallel with a tire axis and a concave obtuse corner is formed at a boundary between the seat side inclined surface and the relevant bead seat, wherein one half of a diameter of the top of the circumferentially extending hump minus an actual diameter of a rim of the tire wheel is in the range of 0.5 mm-2.5 mm, and said well side inclined surface of the hump is formed by part of a conical surface intersecting at an angle of 30°-45° with a straight line in parallel with the tire axis.

2. A tire wheel as set forth in claim 1, wherein the intersecting angle of the conical surface with the straight line is 10°-25°.

3. A tire wheel as set forth in claim 1, wherein said angle of the well side inclined surface with the straight line is 30°-40°.

4. A tire wheel as set forth in claim 1, wherein said concaved obtuse corner at the boundary forms a obtuse angle of 150°-170°.

5. A tire wheel as set forth in claim 1, wherein said value is 1.0 mm-2.0 mm.

6. A tire wheel as set forth in claim 1, wherein the top of the hump is arcuate having a radius of 1 mm-5 mm.

7. A tire wheel as set forth in claim 1, wherein the top of the hump is formed with a flat surface.

8. A tire wheel as set forth in claim 7, wherein an axial width of the flat surface is 0.5 mm-3 mm.

9. A tire wheel as set forth in claim 1, wherein said circumferentially extending hump is provided between the well and the bead seat on an outer side with respect to a vehicle equipped with the tire and a second circumferentially extending hump is provided between the well and the remaining bead seat on an inner side with respect to the vehicle.

10. A tire wheel as set forth in claim 9, wherein both of said humps are similar in shape to each other.

11. The tire wheel of claim 1 wherein said part of conical surface has an inclination angle which is substantially constant in the circumferential direction.

12. The tire wheel of claim 1 wherein said bead seats extend axially inwardly from said flanges at an angle of approximately 5° with respect to a line parallel to an axis of rotation of said wheel.

* * * * *